United States Patent
Tamura et al.

(10) Patent No.: US 8,527,166 B2
(45) Date of Patent: Sep. 3, 2013

(54) SHIFT CONTROL DEVICE FOR VEHICULAR CONTINUOUSLY VARIABLE TRANSMISSION

(75) Inventors: Tadashi Tamura, Nishikamo-gun (JP); Akira Hino, Toyota (JP); Masahiro Tawara, Toyota (JP); Yasunari Matsui, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 437 days.

(21) Appl. No.: 12/667,466

(22) PCT Filed: Jun. 24, 2008

(86) PCT No.: PCT/JP2008/061441
§ 371 (c)(1),
(2), (4) Date: Dec. 31, 2009

(87) PCT Pub. No.: WO2009/004946
PCT Pub. Date: Jan. 8, 2009

(65) Prior Publication Data
US 2010/0191428 A1    Jul. 29, 2010

(30) Foreign Application Priority Data
Jul. 3, 2007    (JP) .................................. 2007-175590

(51) Int. Cl.
*G06F 17/00*    (2006.01)
*F16H 61/664*    (2006.01)

(52) U.S. Cl.
USPC .................... 701/58; 701/55; 477/46; 477/48

(58) Field of Classification Search
USPC ............................................. 701/58; 477/62
See application file for complete search history.

(56) References Cited

U.S. PATENT DOCUMENTS

| 5,007,147 | A | 4/1991 | Imai et al. |
| 6,244,986 | B1 * | 6/2001 | Mori et al. ....................... 477/46 |
| 7,050,898 | B2 * | 5/2006 | Ono et al. ....................... 701/70 |
| 2003/0104903 | A1 | 6/2003 | Kurabayashi |
| 2004/0097328 | A1 | 5/2004 | Makiyama et al. |

FOREIGN PATENT DOCUMENTS

| JP | 01-195145 A | 8/1989 |
| JP | 11-247987 A | 9/1999 |
| JP | 11-257481 A | 9/1999 |
| JP | 2003-083433 A | 3/2003 |

(Continued)

OTHER PUBLICATIONS

Extended European Search Report for corresponding European Patent Application No. 08 79 0580 dated Sep. 1, 2010.

(Continued)

*Primary Examiner* — Thomas Tarcza
*Assistant Examiner* — Tyler J Lee
(74) *Attorney, Agent, or Firm* — Sughrue Mion, PLLC

(57) ABSTRACT

In a shift control device for a vehicular continuously variable transmission with an arrangement in which a normal shift mode is switched to an acceleration shift mode in response to an acceleration demand, a shift control is performed to prevent deterioration to running performance due to a transition to the acceleration shift mode by increased running resistance such as ascending road running or the like against a driver will. An acceleration demand determining value PAPL is set depending on a road surface gradient Φ such that the shifting mode is more difficult to be switched to the acceleration shift mode in a larger road surface gradient Φ, than in a smaller road surface gradient Φ.

4 Claims, 8 Drawing Sheets

(56) References Cited

FOREIGN PATENT DOCUMENTS

| | | |
|---|---|---|
| JP | 2003-172446 A | 6/2003 |
| JP | 2004-100905 A | 4/2004 |
| JP | 2004-125072 A | 4/2004 |
| JP | 2004-162799 A | 6/2004 |

OTHER PUBLICATIONS

Japanese Office Action issued Jul. 12, 2011 for counterpart Japanese Application No. 2007-175590.

* cited by examiner

SHIFT CONTROL DEVICE FOR VEHICULAR CONTINUOUSLY VARIABLE TRANSMISSION

FIELD OF THE INVENTION

This invention relates to a shift control device for a vehicular continuously variable transmission, and more particularly, to improvement of the shift control device in which a shift control is performed with a normal shift mode switched to an acceleration shift mode in response to an acceleration demand of a driver.

DESCRIPTION OF THE RELATED ART

There has heretofore been known a shift control device for a vehicular continuously variable transmission including shift mode switching means arranged to determine as to whether an acceleration demand value of a driver exceeds a predetermined acceleration demand determining value upon which, when the acceleration demand value exceeds the acceleration demand determining value, a shift mode is switched from a normal shift mode to an acceleration shift mode. A shift control device, disclosed in Patent Publication 1, represents one example of such a shift control device wherein whether an acceleration demand is present is determined based on an accelerator operation amount. Subsequently, for the acceleration shift mode in the presence of the acceleration demand, the shift control is performed so as to increase a rotation speed of a prime mover in proportion to the increase of the vehicle speed with a limited increase of an input-shaft rotation speed, i.e., the rotation speed of the prime mover. This improves acceleration feeling. That is, in the normal shift mode, the shift control is performed such that the input-shaft rotation speed is brought into agreement with a target rotation speed calculated (acquired) in terms of parameters such as, for instance, the accelerator operation amount and the vehicle speed.

If the accelerator operation amount increases in the presence of the acceleration demand, the target rotation speed is increased to resultantly increase the input-shaft rotation speed and, in turn, the rotation speed of the prime mover. However, taking time for the rotation speed to increase results in poor response up to increase of the vehicle speed. Meanwhile, the prime mover is kept at a high-rotation speed and a speed ratio is decreased (upshifted) with an increase in vehicle speed. This results in poor ride quality due to increased noise, and hence, no favorable acceleration is necessarily obtained.

[Patent Publication 1] Japanese Patent Application Publication No. 2004-125072

DISCLOSURE OF THE INVENTION

However, if the normal shift mode is switched to the acceleration shift mode depending on the acceleration demand value such as the accelerator operation amount or the like, there is a probability for the shift mode to be switched to the acceleration shift mode despite the driver will who does not necessarily desires to have acceleration. Such switching may occur when an accelerator pedal is deeply depressed under a drive condition with for instance increasing running resistance during ascending road (hill climbing). If the shift mode is switched to the acceleration shift mode, then, the increase of the input-shaft rotation speed, i.e., the rotation speed of the prime mover is limited depending on the accelerator operation amount. In other words, a shift in a downshift direction in which the speed ratio increases is limited. Even if adequate acceleration performance is obtained during a flat road running, no adequate drive force may be necessarily obtained during ascending road running. During such an acceleration shift mode, further, when shift control is performed so as to increase the input-shaft rotation speed in proportion to the increase in vehicle speed, if the vehicle speed increases slowly due to a lack of the drive force, the rotation speed of the prime mover increases slowly. Thus, an adequate drive force cannot be obtained despite a depressed operation of the accelerator pedal, causing the driver to have discomfort feeling such as a stick or the like.

FIG. 13 is an example of a timing chart showing variations in an accelerator operation amount PAP, a target rotation speed NINT and a vehicle speed V used for a shifting control to be performed under the acceleration shift mode described above. Time t1 indicates a timing at which the drive mode is switched to the acceleration shift mode, and the target rotation speed NINT represents a target value of an input-shaft rotation speed substantially corresponding to the rotation speed of the prime mover. During the flat road running, adequate acceleration performance can be obtained as indicated by a solid line. However, during ascending road running with large running resistance, the vehicle speed V increases at a slow rate as indicated by a broken line with a resultant limited increase in the target rotation speed NINT, so that no adequate drive force can be obtained. At the beginning of transition to the acceleration shift mode, the target rotation speed NINT has an initial value NINTOLO, which is determined based on the accelerator operation amount PAP in consideration of noise or the like such that a given acceleration performance can be obtained during the flat road running representing a general running environment. Thus, depending on a running condition, there is likelihood that an appropriate drive force cannot be necessarily obtained.

SUMMARY OF THE INVENTION

The present invention has been completed with the above view in mind, and has an object to provide a shift control device for a vehicular continuously variable transmission, arranged to switch a normal shift mode to an acceleration shift mode in response to an acceleration demand by a driver, which can prevent damage to running performance due to a transition to the acceleration shift mode during ascending road running or the like with increasing running resistance against a driver will.

For achieving the above object, a first aspect of the present invention provides a shift control device for a vehicular continuously variable transmission, including shift mode switching means for determining as to whether an acceleration demand value by a driver exceeds a predetermined acceleration demand determining value and switching a shift mode from a normal shift mode to an acceleration shift mode when the acceleration demand value exceeds the predetermined acceleration demand determining value, the shift control device being characterized in that the acceleration demand determining value is determined depending on a running resistance of a vehicle such that the shift mode is more difficult to be switched to the acceleration shift mode when the running resistance is larger than when the running resistance is smaller.

A second aspect of the present invention is featured by, in the first aspect, that (a) the acceleration demand value is an accelerator operation amount and the shift mode switching means switches the shift mode by determining as to whether the accelerator operation amount exceeds the acceleration demand determining value, and (b) the running resistance is a road surface gradient, and the acceleration demand determining value is determined to be larger when the road surface gradient is larger than when the road surface gradient is smaller.

A third aspect of the present invention is featured by, in the first or second aspect, that during the acceleration shift mode, a shift control is performed so as to increase an input-shaft rotation speed in proportion to an increase in vehicle speed.

A fourth aspect of the present invention is featured by, in anyone of the first to third aspects, that during the acceleration shift mode, a shift control is performed so as to cause the input-shaft rotation speed to be higher when the running resistance is larger than when the running resistance is smaller.

A fifth aspect of the present invention is featured by, in anyone of the first to fourth aspects, that a rise amount of the input-shaft rotation speed during a transition from the normal shift mode to the acceleration shift mode is larger when the running resistance is larger than when the running resistance is smaller.

According to the shift control device for a vehicular continuously variable transmission of the first aspect, the acceleration demand determining value is determined depending on the running resistance of the vehicle such that the shift mode is more difficult to be switched to the acceleration shift mode when the running resistance is larger than when the running resistance is smaller. This prevents a drive mode from being switched to the acceleration shift mode under a drive (running) condition with a large running resistance during ascending road running or the like against the driver will. During the flat road running or the like with a small running resistance, the drive (running) mode is switched to the acceleration shift mode in response to the acceleration demand by the driver, resulting in excellent acceleration feeing and comfortable ride quality. Meanwhile, switching of the drive mode to the acceleration shift mode under the drive condition during ascending road running or the like with the large running resistance against the driver will is prevented, so that damage to running performance due to an inadequate drive force can be prevented.

According to the shift control device for a vehicular continuously variable transmission of the third aspect, during the acceleration shift mode, the shift control is performed so as to increase the input-shaft rotation speed in proportion to the increase in vehicle speed. During the flat road running or the like with a small running resistance, the drive mode is switched to the acceleration shift mode, resulting in excellent acceleration feeing. Meanwhile, this effectively prevents the switching of the shift mode to the acceleration shift mode against the driver will, under a drive condition in the presence of large running resistance with a slow increase of the vehicle speed or a decrease of the vehicle speed in reverse. Consequently, damage to running performance caused by a slow increase of the input-shaft rotation speed due to an increase delay of the vehicle speed can be prevented.

According to the shift control device for a vehicular continuously variable transmission of the fourth aspect, during the acceleration shift mode, the shift control is performed so as to cause the input-shaft rotation speed to be higher when the running resistance is larger than when the running resistance is smaller. Therefore, even if the shift mode is switched to the acceleration shift mode under the drive condition with large running resistance during ascending road running or the like, the input-shaft rotation speed is caused to increase accompanied by an increase in the rotation speed of the prime mover. This renders an increased drive force despite switching of the drive mode the acceleration shift mode, so that excellent running performance can be obtained even under the drive condition with large running resistance during ascending road running or the like.

According to the shift control device for a vehicular continuously variable transmission of the fifth aspect, the rise amount of the input-shaft rotation speed during the transition from the normal shift mode to the acceleration shift mode is larger when the running resistance is larger than when the running resistance is smaller. Therefore, even if the shift mode is switched to the acceleration shift mode under the drive condition during ascending road running or the like with large running resistance, the input-shaft rotation speed is increased accompanied by an increase in the rotation speed of the prime mover. This renders an increased drive force despite switching of drive mode the acceleration shift mode, so that excellent running performance can be obtained even under the drive condition with large running resistance during ascending road running or the like.

Here, the input-shaft rotation speed is controlled as follows in the acceleration shift mode during a flat road running or the like with small running resistance. Like for instance a third aspect, the control is determined such that prime-mover torque is increased in the presence of an increase of the vehicle speed accompanied by an increase of the input-shaft rotation speed (rotation speed of the prime mover), thereby obtaining excellent acceleration feeling. Like fourth and fifth aspects, increasing the input-shaft rotation speed depending on running resistance during ascending road running or the like can immediately render increased prime-mover torque. That is, the control for the input-shaft rotation speed to be executed in the acceleration shift mode is suitably set or determined in consideration of torque characteristic, etc., of the prime mover depending on whether a priority is given to acceleration feeling, etc., or drive-force performance during ascending road running or the like.

The continuously variable transmission is a transmission, capable of varying a speed ratio continuously, which is for example a belt type continuously variable transmission comprised of a pair of variable pulleys having variable width of a V-recess, i.e., variable effective diameters, and a transfer belt wound between the pair of variable pulleys. With the effective diameters of the pair of variable pulleys being variable in a complementary fashion, the speed ratio is continuously varied. However, the present invention may also be preferably applied to shift control devices of various continuously variable transmissions. These include for instance a toroidal type continuously variable transmission that includes a pair of cone members disposed coaxially to be rotatable relative to the other, and a plurality of rollers disposed between those cone members under pinched state. With such a structure with rocking rotary axes of the rollers on planes including the rotary axis of the pair of cone members, the speed ratio is continuously varied.

Further, if a shift control is executed in the continuously variable transmission, then, the input-shaft rotation speed varies with a resultant variation in rotation speed of the prime mover for running a vehicle. It is intended that the present invention is not particularly limited to a kind of the prime mover. That is, although a gasoline engine and a diesel engine, each operative to generate drive power upon combustion of fuel, and an electric motor drivably rotated with electric energy can be widely used, the present invention may be applied also to a hybrid vehicle or the like including a plurality of kinds of prime movers.

The acceleration demand value by the driver is a parameter representing an output amount demanded to the vehicle by the driver. As such a parameter, use is made of a displacement value of an accelerator pedal (accelerator operation amount), a throttle valve opening controllable in response to such an accelerator operation amount, a fuel injection amount representing an injection amount of fuel injected into a chamber formed in an intake pipe of an engine or a cylinder, and an intake air amount drawn through the intake pipe of the engine, etc. Further, varying speeds of these parameters may also be employed. Further, the acceleration demand value is used for determining as to whether the driver desires to have given acceleration. For instance, even for the same accelerator operation amounts, a desire to the acceleration depends on a vehicle speed. Thus, a parameter may be preferably set including the vehicle speed or a physical quantity having a fixed relationship with the vehicle speed. This similarly applies to other cases where other acceleration demand values than the accelerator operation amount are used. Furthermore, the acceleration demand determining value is determined in terms of running resistance, and set by a map or calculation formula, etc., so as to continuously vary depending on for instance a road surface gradient. However, the acceleration demand determining value need not be continuously varied, and it may be varied step by step. In addition, it may suffice to merely provide two acceleration demand determining values for a large running resistance and a small running resistance.

The normal shift mode is defined such that the shift control is performed to match the input-shaft rotation speed with the target rotation speed calculated in terms of the parameters including for instance the acceleration demand value (corresponding to an output demand amount) and the vehicle speed. If the acceleration demand amount rapidly increases in response to an acceleration demand, the target rotation speed is caused to increase at once such that the input-shaft rotation speed, i.e., further, the rotation speed of the primer mover are increased at once. However, there is likelihood that taking time to increase the rotation speed degrades response up to an increased vehicle speed. Moreover, with the prime mover kept at a high-speed rotation state, a speed ratio is caused to decrease (upshift) with an increase in vehicle speed. This results in uncomfortable riding quality with increased noise and acceleration feeling not necessarily favorable. Thus, in the acceleration demand, the shift control is structured to perform the acceleration shift mode different from the normal shift mode. In addition, the vehicle speed (output-shaft rotation speed) not rapidly varying can be regarded to be constant in the shift control. Thus, the shift control of the target rotation speed, i.e., the input-shaft rotation speed, can be executed by calculating a target speed ratio instead of the target rotation speed, associating with a speed ratio (input-shaft rotation speed/output-shaft rotation speed) of the continuously variable transmission.

The acceleration shift mode performs the shift control superior in acceleration performance, acceleration feeling or noise, etc., than that in the shift control performed by the normal shift mode. That is, for instance, an operation is executed with limiting an increase of the input-shaft rotation speed, i.e., the rotation speed of the prime mover in response to the accelerator operation amount, the input-shaft rotation speed is caused to increase up to a given initial value set based on the acceleration demand value or the like, and subsequently, the shift control is performed such that the input-shaft rotation speed is increased in proportion to the increase of the input-shaft rotation speed. However, no need necessarily arises for the input-shaft rotation speed to be completely proportional to the vehicle speed, that is, for the speed ratio to be kept constant, and the input-shaft rotation speed may suffice to increase in the value obtained by multiplying a vehicle speed variation by a given coefficient. That is, if the vehicle speed linearly varies at a fixed varying rate, the input-shaft rotation speed may suffice to linearly vary at a fixed varying rate. In addition, an alternative may be possible to be implemented in various modes. Meanwhile, the input-shaft rotation speed may be caused to increase at a varying rate determined depending on the acceleration demand value or the like regardless of a variation in vehicle speed.

Like the fourth and fifth aspects, in the acceleration shift mode, the shift control may be preferably performed such that the input-shaft rotation speed becomes higher for the large running resistance than that for the small running resistance. In carrying out the other inventions, alternative various modes may be implemented. That is, the shift control may be preferably performed depending on the acceleration demand value or the like regardless of running resistance.

When running resistance is large, for instance, like the second invention, the road surface gradient is large, an acceleration demand determining value is set depending on the road surface gradient. However, the acceleration demand determining value may have a large value for the large running resistance in a situation where the road surface gradient frequently varies such as a mountain path. In addition, since a variation in running resistance occurs depending on a road surface condition as to whether the road surface is a pavement road or a rough road, and a wet state or dry state or the like, the acceleration demand determining value may be varied depending on such a road surface condition. Thus, various modes may be employed.

EXPLANATION OF REFERENCES

Figure 1:
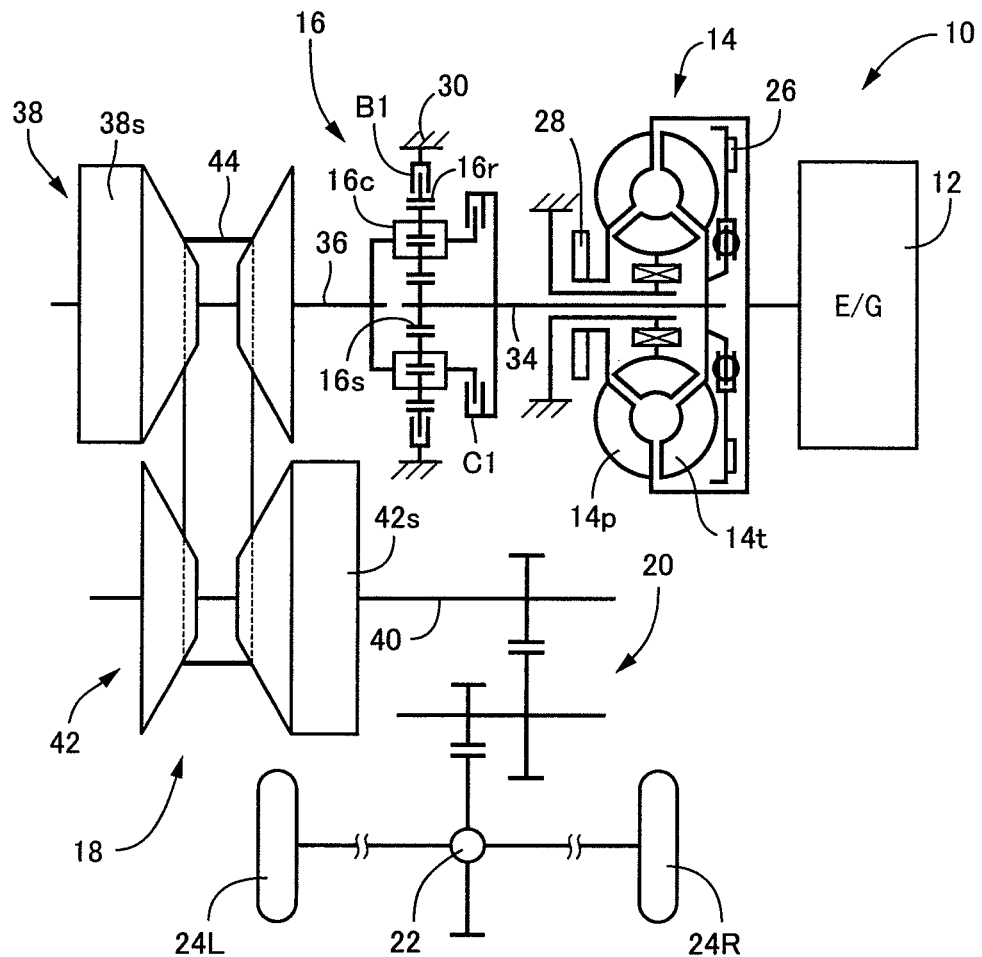
FIG. 1 is a skeleton view illustrating one example of a vehicular drive apparatus to which the present invention is applied.

18: belt-type continuously variable transmission (continuously variable transmission)
36: input shaft
50: shift control circuit
80: electronic control device
88: vehicle speed sensor
90: input-shaft rotation speed sensor
92: gradient sensor
102: shift mode switching means
104: normal shift means (normal shift mode)
106: linear shift means (acceleration shift mode)
Φ: road surface gradient (running resistance)
PAP: accelerator operation amount (acceleration demand value)
PAPL: acceleration demand determining value
NINTLB: acceleration target-rotation-speed reference value
NINTL0: acceleration target-rotation-speed initial value (rise amount)
NINTLSLP: gradient correction value

DETAILED DESCRIPTION OF THE PREFERRED EMBODIMENTS

Now, embodiments according to the present invention will be described below in detail.

Embodiment

FIG. 1 is a skeleton view illustrating a vehicular drive apparatus 10 to which the present invention is applied. The vehicular drive apparatus 10 is of a transverse-mounted type preferably adopted in an FF (front engine and front drive) vehicle and includes an engine 12, such as an internal combustion engine like a gasoline engine and a diesel engine, etc., which serves as a drive-force source (prime mover) for driving a vehicle. The engine 12 generates an output, which is transferred from a torque converter 14 to a differential gear device 22 via a forward-drive/reverse-drive switching device 16, a belt-type continuously variable transmission (CVT) 18 and a reduction gear mechanism 20 for delivery to left and right drive wheels 24L and 24R.

The torque converter 14, corresponding to a hydraulic type power transfer device, includes a pump blade wheel 14p connected to a crankshaft of the engine 12 and a turbine blade wheel 14t connected to the forward-drive/reverse-drive switching device 16 via a turbine shaft 34 for performing a power transfer by fluid. Further, disposed between the pump blade wheel 14p and the turbine blade wheel 14t is a lockup clutch 26 through which these elements are unitarily connected to each other for unitary rotation. The pump blade wheel 14p carries thereon a mechanical type oil pump 28 that generates a hydraulic pressure for performing a shift control and generating a belt-pinching force in the continuously variable transmission 18, controllably engaging or disengaging the lockup clutch 26, and supplying lubricating oil to various parts.

The forward-drive/reverse-drive switching device 16 is structured of a double-pinion type planetary gear set. A turbine shaft 34 of the torque converter 14 is connected to a sun gear 16s, and an input shaft 36 of the continuously variable transmission 18 is connected to a carrier 16c. If a forward-drive clutch C1 disposed between the carrier 16c and the sun gear 16s is caused to engage, then, the forward-drive/reverse-drive switching device 16 is caused to unitarily rotate, which allows the turbine shaft 34 to be directly connected to the input shaft 36 such that a drive force in a forward-drive direction is applied to the drive wheels 24L and 24R. In addition, if a reverse-drive brake B1 disposed between the ring gear 16r and a housing 30 is caused to engage with the above forward-drive clutch C1 being caused to disengage, then, the input shaft 36 is caused to rotate in a reverse direction with respect to the turbine shaft 34 to transmit the drive force in a reverse-drive direction to the drive wheels 24L and 24R.

The continuously variable transmission 18 includes a primary sheave (an input-side variable pulley) 38 mounted on an input shaft 36 to vary an effective diameter, a secondary sheave (an output-side variable pulley) 42 mounted on an output shaft 40 to vary a variable effective diameter, and a transfer belt 44 wound between the primary and secondary sheaves 38 and 42. A power transfer is performed using a frictional force occurring between both of the sheaves 38 and 42 and the transfer belt 44. The primary and secondary sheaves 38 and 42, structured to vary widths of variable V-recesses, respectively, include hydraulic cylinders 38s and 42s. With controlling a hydraulic pressure (primary sieve sheave pressure) Pin of the hydraulic cylinder 38s of the primary sheaves 38 by a shift control circuit 50 (see FIG. 2), the V-recess widths of both the sheaves 38 and 42 are varied for changing an engaging diameter (effective diameter) of the transfer belt 44. This allows a speed ratio y (=input-shaft rotation speed NIN/an output-shaft rotation speed NOUT) to continuously vary.

Further, a pinching pressure control circuit 70 (see FIG. 2) controllably regulates a hydraulic pressure (secondary sheave pressure) Pout of the hydraulic cylinder 42s of the secondary sheave 42 such that no slippage occurs in the transfer belt 44. The shift control circuit 50 and the pinching pressure control circuit 70 have structures each including a linear solenoid valve and a duty solenoid valve whose hydraulic output pressures are continuously controlled by an electronic control device 80 shown for instance in FIG. 2, and a control valve etc. for controllably regulating the primary sheave pressure Pin and the secondary sheave pressure Pout depending on the hydraulic output pressure of them.

Figure 2:
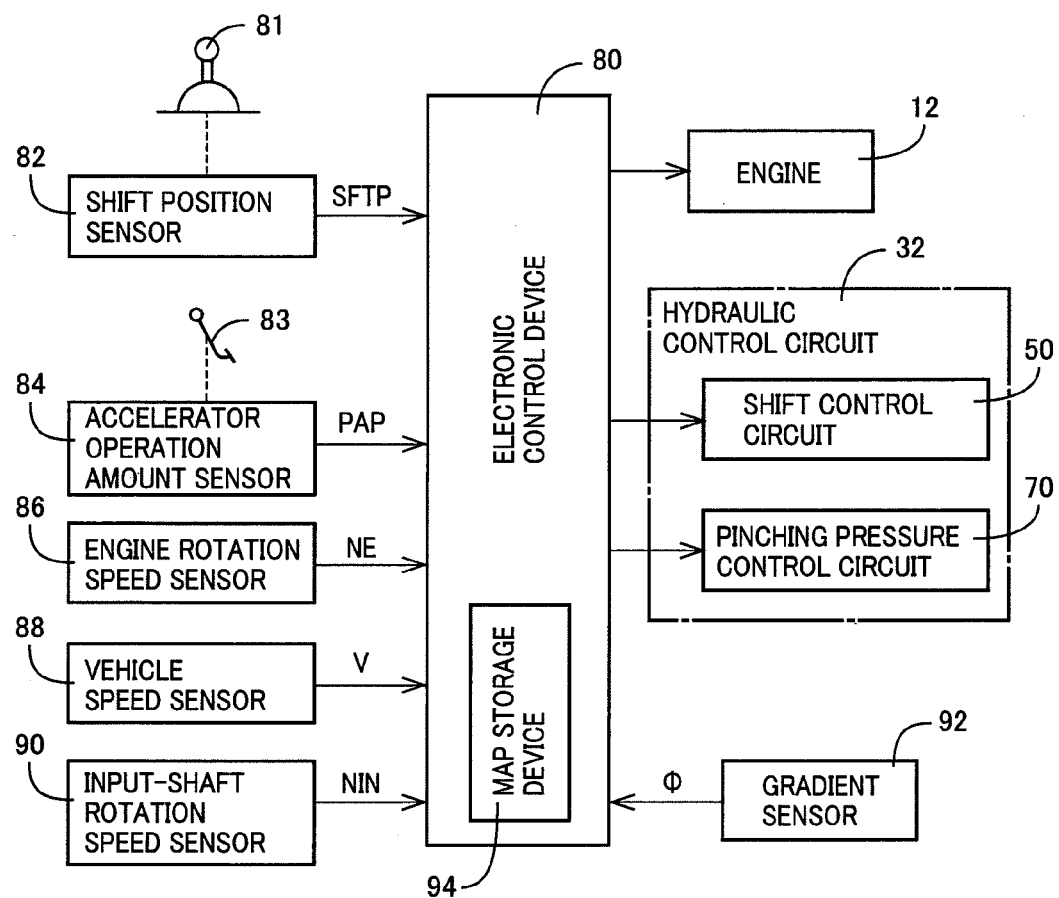
FIG. 2 is a block diagram illustrating a control system of a continuously variable transmission in the vehicular drive apparatus shown in FIG. 1.

In FIG. 2, the electronic control device 80 is structured including a microcomputer which performs signal processing in accordance with programs preliminarily stored in a ROM with utilizing a temporarily storage function of a RAM to execute the shift control and the pinching pressure control of the continuously variable transmission 18, an output control of the engine 12 and the like. The electronic control device 80 may be formed in separate structures for an engine control and a CVT control, etc. depending on needs.

To the electronic control device 80, a shift position sensor 82, an accelerator operation amount sensor 84, an engine rotation speed sensor 86, a vehicle speed sensor 88, an input-shaft rotation speed sensor 90, and a gradient sensor 92, etc. are connected. Thus, the electronic control device 80 is supplied with various signals representing a variety of information required for the various controls, which include a shift position SFTP of a shift lever 81; a displacement amount (accelerator operation amount) PAP of an accelerator pedal 83; an engine rotation speed NE; a vehicle speed V (corresponding to the rotation speed NOUT (output-shaft rotation speed) of the output shaft 40); an input-shaft rotation speed NIN (rotation speed of the input shaft 36); and a road surface gradient Φ, etc.

The accelerator pedal 83 is an output demand operation member manipulated by a driver depending on an output demand amount and the accelerator operation amount PAP represents an output demand that corresponds to an acceleration demand value in the illustrated embodiment. Further, the gradient sensor 92, corresponding to a gradient detection means for detecting the road surface gradient Φ, is an acceleration sensor in the illustrated embodiment. The gradient sensor 92 calculates the road surface gradient Φ by comparing its acceleration with an actual vehicle acceleration calculated by the vehicle speed V. The road surface gradient Φ may be calculated by comparing a flat road reference acceleration calculated by a throttle-valve opening of the engine 12 and the speed ratio γ etc. of the continuously variable transmission 18, and the actual vehicle speed acceleration using various gradient detecting means. Furthermore, the hydraulic control circuit 32 includes, besides the shift control circuit 50 and the pinching pressure control circuit 70 or the like, a line pressure control circuit for controllably regulating a line pressure PL, and a lockup clutch control circuit for performing an engagement/disengagement control and a sliding control or the like of the lockup clutch 26, etc.

Figure 3:
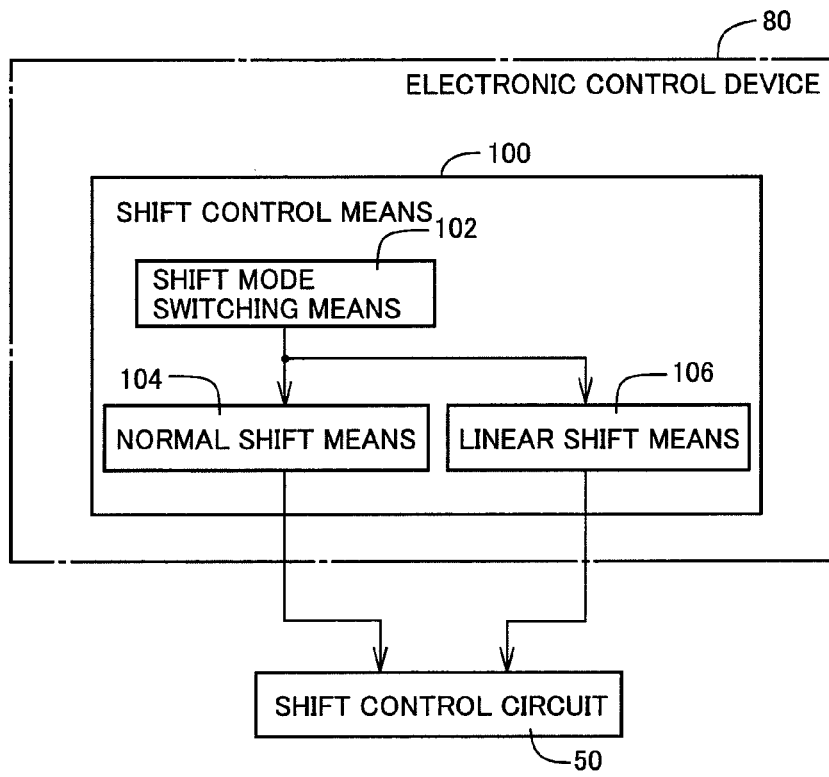
FIG. 3 is a block diagram illustrating a function incorporated in an electronic control device shown in FIG. 2 in relation to a shift control.

FIG. 3 is a block diagram illustrating a function incorporated in an electronic control device shown in FIG. 2 in relation to a shift control. The shift control means 100 includes shift mode switching means 102, normal shift means 104 and linear shift means 106. The normal shift means 104 serves to perform a shift control under a normal shift mode, the linear shift means 106 serves to perform the shift control under an acceleration shift mode, and the shift mode switching means 102 serves to switch a drive mode between the normal shift mode executed by the normal shift means 104, and the acceleration shift mode executed by the linear shift means 106. The linear shift means 106 operative to perform the shift control under the acceleration shift mode is acceleration shift means.

Figure 4:
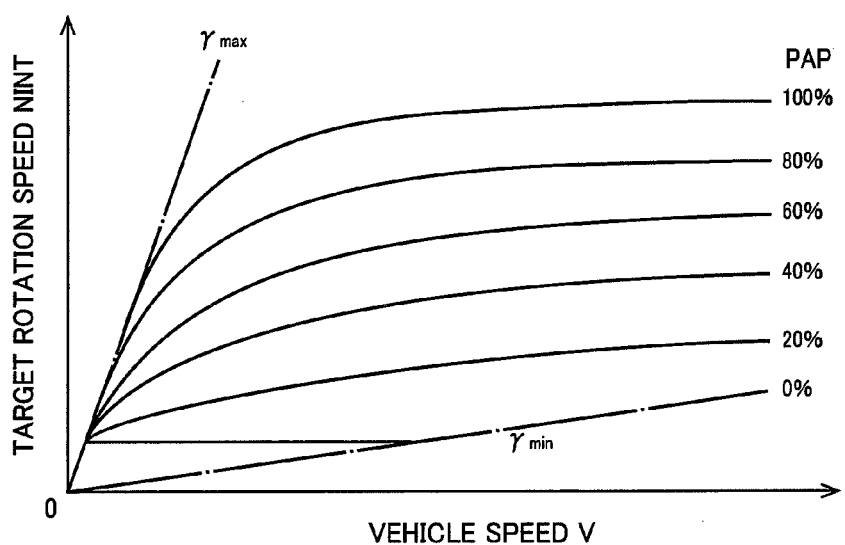
FIG. 4 is a view showing an example of a shifting map used in the shift control under a normal shift mode, executed by normal shift means shown in FIG. 3, on obtaining a target rotation speed NINT.

Detailed description of the shift control will be provided by the normal shift mode which is executed by the normal shift means 104. An input-side target rotation speed NINT is calculated by referring to a shifting map preliminarily determined in terms of parameters including for instance the accelerator operation amount PAP and the vehicle speed V as shown in FIG. 4. In addition, a duty ratio of a duty solenoid valve or a drive current etc. of the liner solenoid valve of the shift control circuit 50 is subjected to feedback controls depending on a deviation between the actual input-shaft rotation speed NIN and the target rotation speed NINT such that the actual input-shaft rotation speed NIN and the target rotation speed NINT match with each other. This controls the supply or drain of hydraulic oil to and from the hydraulic cylinder 38s of the primary sheave 38.

The map shown in FIG. 4 corresponds to a shifting condition under which the target rotation speed NINT is set such that the lower the vehicle speed and the larger the accelerator operation amount PAP are, the larger the speed ratio γ becomes. Moreover, since the vehicle speed V corresponds to the output-shaft rotation speed NOUT, the target rotation speed NINT, representing a target value of the input-shaft rotation speed NIN, corresponds to a target speed ratio that is determined within in a range between a minimal speed ratio γmin and a maximal speed ratio γmax of the continuously variable transmission 18. The shifting map is preliminarily stored in a map storage device (memory means such as ROM) of the electronic control device 80. In addition, in place of using the accelerator operation amount PAP intact, the shifting map may be set in terms of a parameter including a demanded output (power) by the driver calculated in consideration of the vehicle speed V or the like.

Under such a normal shift mode, if the accelerator operation amount PAP rapidly increases due to an acceleration demand by the driver, the target rotation speed NINT is caused to increase at once such that the input-shaft rotation speed NIN, and further, the rotation speed NE of the engine 12 is caused to increase at once. However, taking time for the engine rotation speed NE to increase degrades response when the vehicle speed V begins to increase. Further, with the engine 12 sustained in a high-speed rotation state the speed ratio γ is decreased (upshifted) with increase of the vehicle speed. This leads to uncomfortable ride quality due to increase in noise and a poor acceleration feeling. Therefore, for the acceleration demand conceived that the driver desires to have a given acceleration, the shift mode switching means 102 switches the shift mode to the shift control by the linear shift means 106 such that the shift control is performed under the acceleration shift mode suited for an accelerating running.

Figure 5:
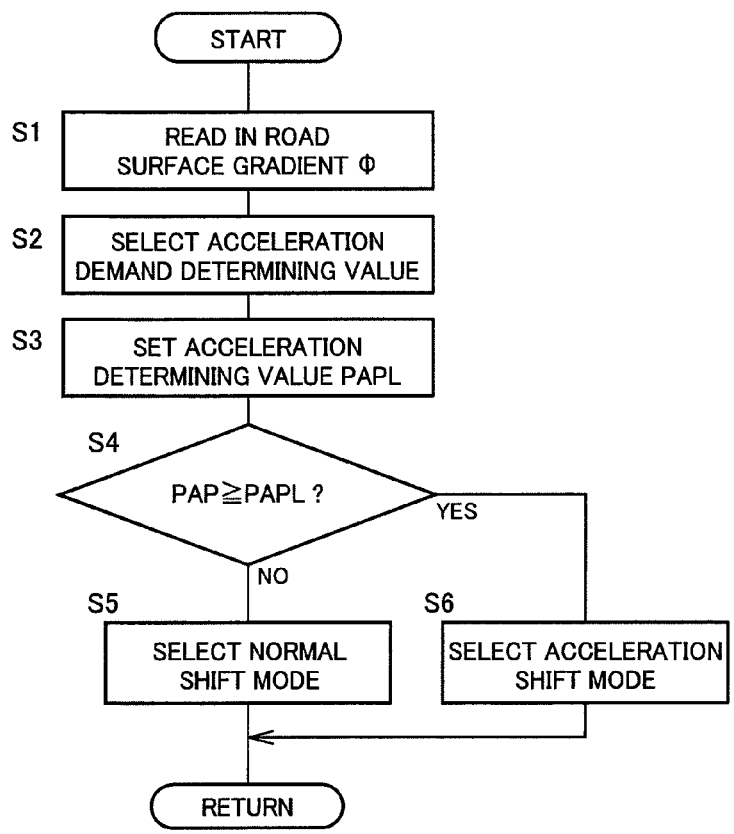
FIG. 5 is a flowchart illustrating in detail signal processing executed by shift mode switching means shown in FIG. 3.
Figure 13:
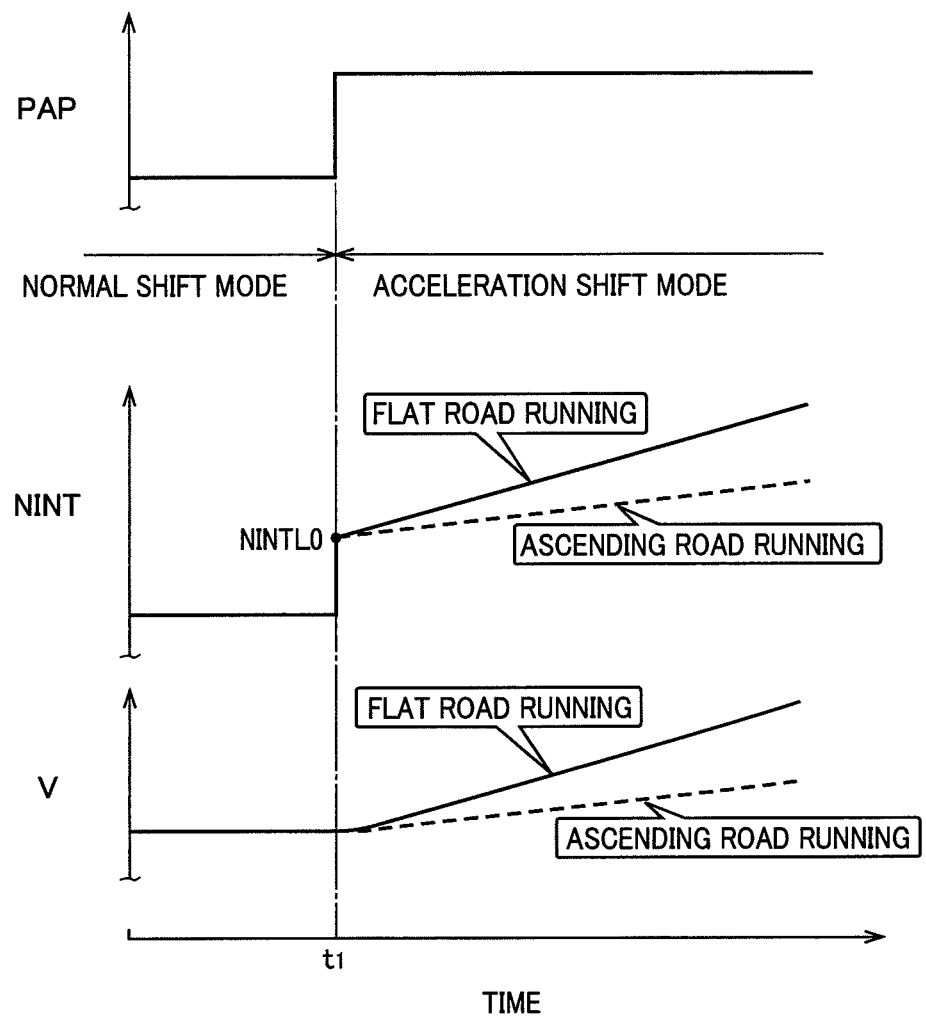
FIG. 13 is one example of a timing chart showing variations in the target rotation speed NINT or the like when the shift control is performed under a conventional acceleration shift mode in comparison between a flat road and the ascending road.

The shift mode switching means 102, operative to switch the shift mode depending on the acceleration demand, performs signal processing in accordance with for instant a flowchart shown in FIG. 5, thereby querying as to whether the acceleration demand is present after which the shift mode is switched. A flow chart shown in FIG. 5 is repeatedly executed for a given cycle time. At step S1, the road surface gradient Φ is read in. At step S2, a map of an acceleration demand determining value PAPL is selected depending on the road surface gradient Φ for determining presence of the acceleration demand based on the accelerator operation amount PAP. That is, during ascending road running with the large road surface gradient Φ, even if the driver has no desire to have acceleration, the accelerator pedal 83 may be deeply depressed so as to obtain a desired drive force for enabling the vehicle to run on the ascending road. However, if the shift control is performed in the acceleration shift mode even under such a situation, an adverse effect occurs to damage to the ascending performance as shown in FIG. 13.

Figure 6:
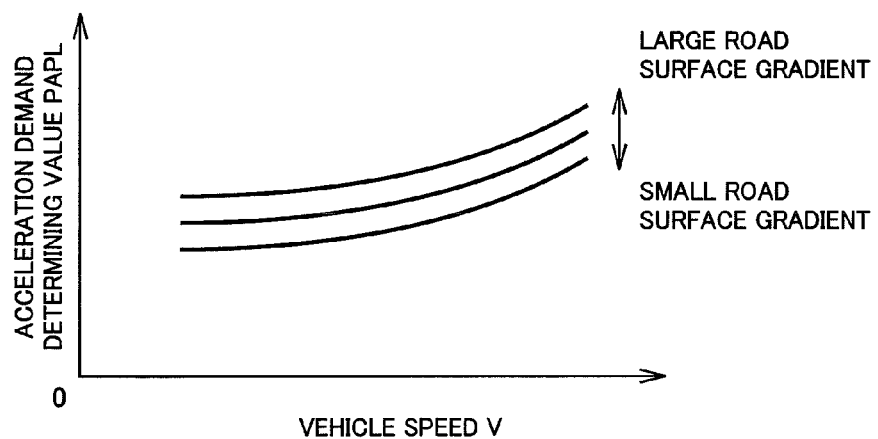
FIG. 6 is a view illustrating one example of an acceleration demand determining value map selected depending on a road surface gradient Φ at step S2 shown in FIG. 5.

In view of this, the larger the road surface gradient Φ is, the more switching of the drive mode to the acceleration shift mode is suppressed. As shown in for instance FIG. 6, the larger the road surface gradient Φ is, the more the acceleration demand determining value becomes large. In addition, if the vehicle speed V increases, the accelerator operation amount PAP increases even under no desire for acceleration. Thus, the acceleration demand determining map is set in terms of the parameter of the vehicle speed V such that the larger the vehicle speed V is, the larger the acceleration demand determining value PAPL becomes. In the illustrated embodiment, the road surface gradient Φ represents running resistance.

Figure 9:
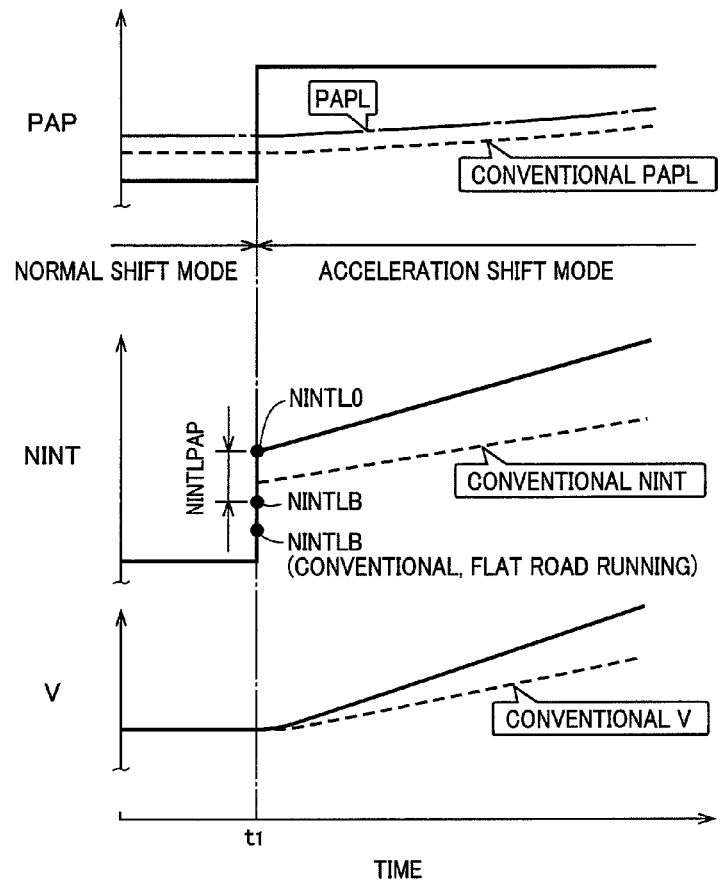
FIG. 9 is one example of a timing chart showing a variation in the target rotation speed NINT or the like when the linear shift means of FIG. 3 performs the shift control in the acceleration shift mode in the ascending road.

Turning back to FIG. 5, at step S3, the acceleration demand determining value PAPL is calculated based on the vehicle speed V by referring to the acceleration demand determining map selected at step S2. At step S4, a comparison is made between the acceleration demand determining value PAPL and the actual accelerator operation amount PAP. If PAP<PAPL, then, no desire for acceleration by the driver is determined. At succeeding step S5, the normal shift mode is selected, thereby causing the normal shift means 104 to execute the shift control. In contrast, if PAP≧PAPL, then, a desire for the acceleration by the driver is determined. At subsequent step S6, the acceleration shift mode is selected, thereby causing the linear shift means 106 to execute the shift control. FIG. 9 represents one example of a timing chart showing a case wherein during ascending road running with the large road surface gradient Φ, the answer to step S4 is YES, i.e., PAP≧PAPL, and at timing t1, the normal shift mode is shifted to the acceleration shift mode.

Figure 7:
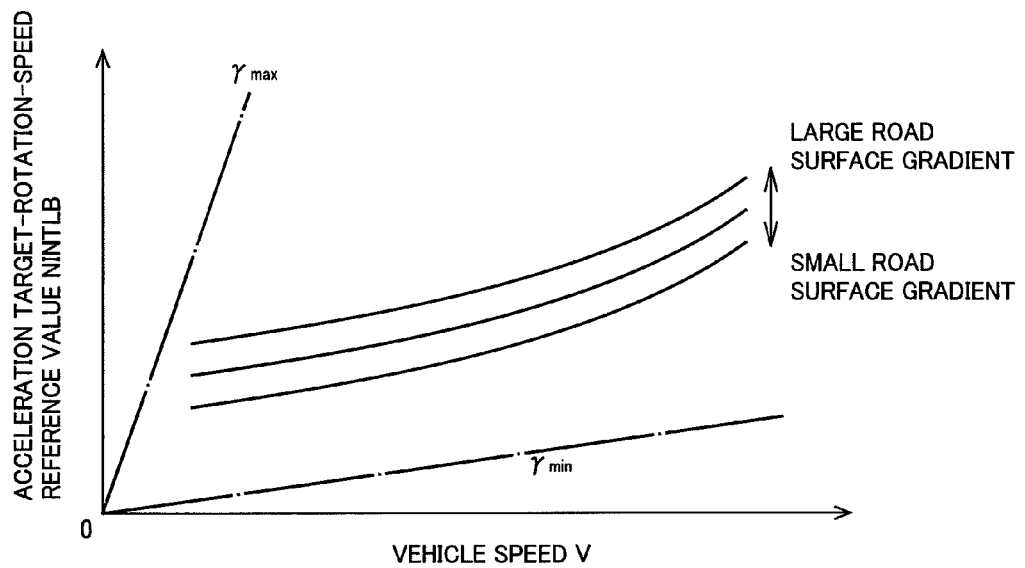
FIG. 7 is a view illustrating one example of a map used in a shift control under an acceleration shift mode executed by linear shift means shown in FIG. 3 on calculating an acceleration target-rotation-speed reference value NINTLB.

Referring to FIG. 9, detailed description will be provided of the shift control executed in the acceleration shift mode by the linear shift means 106. First, as expressed in a formula (1) described below, an acceleration target-rotation-speed reference value NINTLB, an accelerator operation correction value NINTLPAP and a vehicle-speed-variation correction value NINTLSPD are added for calculation of the target rotation speed NINT. The acceleration target-rotation-speed reference value NINTLB is determined as a map or a computing formula in terms of parameters including the road surface gradient Φ and the vehicle speed V as shown in FIG. 7. The acceleration target-rotation-speed reference value NINTLB is set such that the lower the vehicle speed V is and the larger the road surface gradient Φ is, the larger the speed ratio γ is, i.e., the larger the target rotation speed NINT becomes. During the continuous shift control executed in a series of the acceleration shift mode, for the acceleration target-rotation-speed reference value NINTLB, a fixed value is used intact which is initially calculated when the shift mode is shifted to the acceleration shift mode. With the present embodiment, the larger the road surface gradient Φ is, the larger the acceleration target-rotation-speed reference value NINTLB becomes. Therefore, the acceleration target-rotation-speed reference value NINTLB for the ascending road running, is set to lie at a value larger than the conventional acceleration target-rotation-speed reference value NINTLB, for the flat road running Thus, the target rotation speed NINT upon transition to the acceleration shift mode has an initial value NINTL0 increased in width by that extent.

$$NINT=NINTLB+NINTLPAP+NINTLSPD \quad (1)$$

Figure 8:
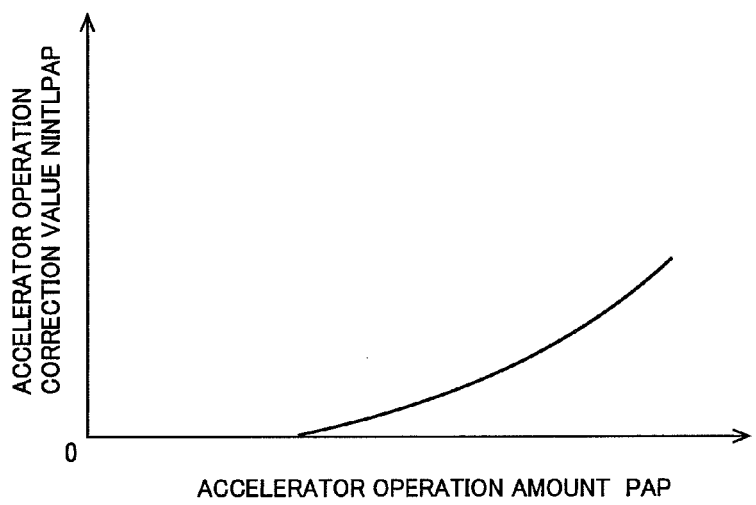
FIG. 8 is a view illustrating one example of a map used in a shift control under an acceleration shift mode executed by linear shift means shown in FIG. 3 on calculating an accelerator displacement correction value NINTLPAP.

The accelerator operation correction value NINTLPAP, representing a correction value used for increasing the target rotation speed NINT such that the larger the accelerator operation amount PAP, i.e., the acceleration demand value is, the larger the target rotation speed NINT becomes. This correction value NINTLPAP is obtained in accordance with a map or calculation formula preliminarily determined in terms of a parameter including the actual accelerator operation amount PAP as shown in for instance FIG. 8. Further, the vehicle-speed-variation correction value NINTLSPD represents a correction value for increasing the target rotation speed NINT, i.e., the input-shaft rotation speed NIN in proportion to an increase in vehicle speed V. As expressed in for instance a formula (2) described below, the vehicle-speed-variation correction value NINTLSPD can be obtained by adding a value obtained by multiplying a variation speed ΔV of the vehicle speed V, or, a variation amount ΔV of the vehicle speed V per cycle time by a correction value α, to a preceding correction value NINTLSPDi−1. If, for instance, the vehicle speed linearly increases at a fixed varying rate, the vehicle-speed-variation correction value NINTLSPD is also caused to linearly increase at the fixed varying rate.

The accelerator operation correction value NINTLPAP and the vehicle-speed-variation correction value NINTLSPD are sequentially updated, in a process of executing the shift control in a series of the shift modes, each time the target rotation speed NINT is calculated for a given cycle time. Thus, the vehicle-speed-variation correction value NINTLSPD is caused to continuously increase depending on the increase in vehicle speed V. The map of FIG. 8 related to the accelerator operation correction value NINTLPAP and the map of FIG. 7 related to the acceleration target-rotation-speed reference value NINTLB are preliminary stored in the map storage device 94 of the electronic control device 80, in addition to the shifting map shown in FIG. 4.

$$NINTLSPDi=NINTLSPDi-1+\alpha \times \Delta V \quad (2)$$

After obtaining the target rotation speed NINT in accordance with the formula (1) set forth above, like the normal shift mode, the actual input-shaft rotation speed NIN is controlled so as to match with the target rotation speed NINT. This is accomplished by performing the feedback controls of the duty ratio of the duty solenoid valve or the drive current of the linear solenoid valve of the shift control circuit 50 etc. depending on a relevant deviation therebetween. This controls the supply and drain of hydraulic oil to and from the hydraulic cylinder 38s of the primary sheave 38. In addition, the final target rotation speed NINT is guarded not to exceed the maximal speed ratio γmax of the continuously variable transmission 18 regardless of presence /absence of the correction.

With the shift control device of the present embodiment described above, the acceleration demand determining value PAPL is determined depending on the road surface gradient Φ such that when the running resistance of the vehicle, i.e., the road surface gradient Φ is large, the drive mode is more difficult to be switched to the acceleration shift mode than when the road surface gradient Φ is small. This suppresses the drive mode from being switched to the acceleration shift mode against the driver will during ascending road running with an increasing accelerator operation amount PAP. During the flat road running with the small road surface gradient Φ, the drive mode is switched to the acceleration shift mode in response to the acceleration demand by the driver, resulting in excellent comfortable ride quality and acceleration feeling. Meanwhile, this prevents a degradation to ascending performance caused by the inadequate drive force provided due to the drive mode switched to the acceleration shift mode against the driver will during ascending road running with the large road surface gradient Φ.

During the acceleration shift mode, further, the target rotation speed NINT is corrected using the vehicle-speed-variation correction value NINTLSPD so as to cause the target rotation speed NINT, i.e., the input-shaft rotation speed NIN to increase in proportion to an increase in vehicle speed V. This arrangement allows the drive mode to be switched to the acceleration shift mode during the flat road running with the small road surface gradient Φ, resulting in excellent acceleration feeling. Meanwhile, the above arrangement effectively prevents degradation to running performance due to an increase delay of the input-shaft rotation speed NIN caused by a increase delay of the vehicle speed V. This occurs when the shift mode is switched to the acceleration shift mode against the driver will during ascending road running with the large road surface gradient Φ wherein the vehicle speed V slowly increases or drops.

With the acceleration shift mode in the illustrated embodiment, further, when the road surface gradient Φ is large, the acceleration target-rotation-speed reference value NINTLB is made larger than that when the road surface gradient Φ is small. This allows the initial value NINTL0 of the target rotation speed to have an increasing rise width during the transition to the acceleration shift mode. Therefore, even if the shift mode is switched to the acceleration shift mode during ascending road running, the target rotation-speed initial value NINTL0 becomes high to a resultantly increase the engine rotation speed NE. Thus, the large drive force can be immediately obtained despite switching of the drive mode to the acceleration shift mode, thereby rendering excellent ascending performance. That is, the acceleration target-rotation-speed reference value NINTLB for the flat road is determined so as to allow the engine to have a lower rotation speed than that with engine torque marking a peak value to obtain excellent acceleration feeling. This is accomplished by increasing engine torque with increasing the engine rotation speed NE with an increase of the vehicle speed V. For the ascending road running, on the contrary, the acceleration target-rotation-speed reference value NINTLB is determined so as to mark a higher level depending on the torque characteristic such that large engine torque can be obtained at once.

Figure 10:
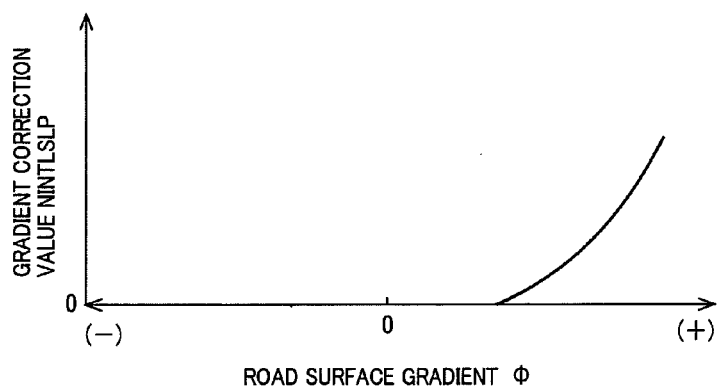
FIG. 10 is a view, illustrating another embodiment according to the present invention, which shows one example of a map used in the shift control under the acceleration shift mode on calculating a gradient correction value NINTLSLP.

In the illustrated embodiment described above, the acceleration target-rotation-speed reference value NINTLB is set in terms of the parameters including the road surface gradient Φ and the vehicle speed V such that the larger the road surface gradient Φ is, the larger the target rotation speed NINT becomes. However, the acceleration target-rotation-speed reference value NINTLB may be determined in terms of a parameter including only the vehicle speed V such that given acceleration performance is obtained for the flat road running. In addition, as indicated by the formula (3) expressed below, the target rotation speed NINT may be calculated by adding, to the accelerator operation correction value NINTLPAP and the vehicle-speed-variation correction value NINTLSPD, the gradient correction value NINTLSLP. The gradient correction value NINTLSLP used in this case, may be determined in accordance with a map, defined in terms of the parameter such as the road surface gradient Φ, and a calculating formula or the like. This is determined such that with the road surface gradient Φ being positive and exceeding a given value as shown for instance in FIG. 10, the larger the road surface gradient Φ is, the larger the correction value becomes. Like the accelerator operation correction value NINTLPAP and the vehicle-speed-variation correction value NINTLSPD, the gradient correction value NINTLSLP is sequentially updated each time the target rotation speed NINT is calculated for a given cycle time. Like the map on the accelerator operation correction value NINTLPAP, the map of FIG. 10 related to the gradient correction value NINTLSLP is preliminarily stored in the map storage device 94 of the electronic control device 80.

$$NINT=NINTLB+NINTLPAP+NINTLSPD+NINTLSLP \quad (3)$$

Figure 11:
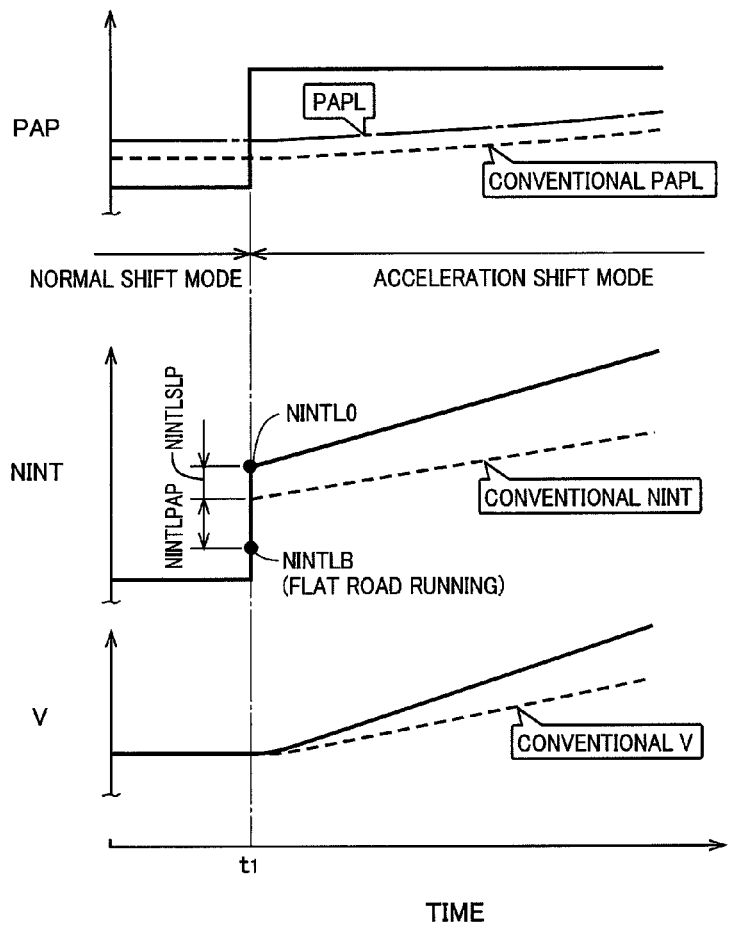
FIG. 11 is one example of a timing chart showing a variation in the target rotation speed NINT or the like when the shift control is performed on the ascending road under the acceleration shift mode using the gradient correction value NINTLSLP shown in FIG. 10.

Even in the illustrated embodiment, the larger the road surface gradient Φ is, the larger the gradient correction value NINTLSLP becomes. Thus, even if the acceleration target-rotation-speed reference value NINTLB takes the same value as that of the conventional, i.e., the case of the flat road running, the target rotation speed NINT is caused to increase from the beginning of starting the acceleration shift mode, as shown in FIG. 11, by the gradient correction value NINTLSLP for the ascending road running. With such an increase in the gradient correction value NINTLSLP, the engine rotation speed NE also increases. This render the excellent ascending performance due to an increasing drive force provided despite switching of the drive mode to the acceleration shift mode like the previous embodiment.

Figure 12:
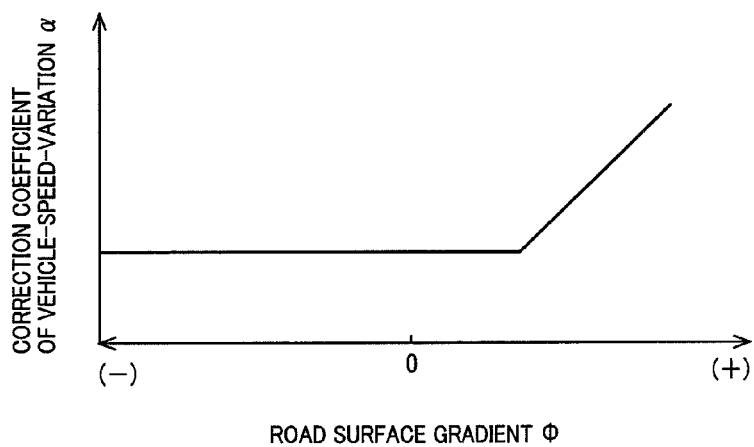
FIG. 12 is a view, illustrating further another embodiment according to the present invention, which shows one example of a map of a correction coefficient α used in the shift control under the acceleration shift mode on calculating a vehicle-speed-variation correction value NINTLSPD.

Further, under a circumstance where the road surface gradient Φ is positive and exceeds a given value as shown in FIG. 12, the correction coefficient α of the vehicle-speed-variation correction value NINTLSPD may be determined using a map defined in terms of the parameter such as the road surface gradient Φ and a calculation formula or the like such that the larger the road surface gradient Φ is, the larger the value of the correction coefficient α becomes. Even in this case, the larger the road surface gradient Φ is, the larger the correction coefficient α becomes, so that the vehicle-speed-variation correction value NINTLSPD is made large. This increases the target rotation speed NINT, thereby rendering the same advantageous effects as those of the previous embodiment. Like the accelerator operation correction value NINTLPAP, the correction coefficient α is sequentially updated each time the target rotation speed NINT is calculated for the given cycle time. In addition, like the map such as the accelerator operation correction value NINTLPAP or the like, a map of FIG. 12 related to the correction coefficient α is preliminarily stored in the map storage device 94 of the electronic control device 80.

While the present invention has been described above with reference to the embodiments shown in the drawings, it is intended that the present invention described be considered only as illustrative of the embodiments and that the present invention may be implemented in various modifications and improvements based on knowledge of those skilled in the art.

The invention claimed is:

1. A shift control device for a vehicular continuously variable transmission, including shift mode switching means for determining as to whether an accelerator operation amount being an acceleration demand value by a driver exceeds a predetermined acceleration demand determining value and switching a shift mode from a normal shift mode in which an input-shaft rotation speed is controlled in accordance with a predetermined shifting condition in terms of parameters including the accelerator operation amount and a vehicle speed to an acceleration shift mode when the accelerator operation amount exceeds the predetermined acceleration demand determining value, the shift control device comprising:
the acceleration shift mode performing a shift control such that an input shaft rotation speed upon switching from the normal shift mode to the acceleration shift mode is caused to increase up at once to a predetermined initial value smaller than a value calculated in accordance with the shifting condition in the normal shift mode and subsequently, the input shaft rotation speed is increased in proportion to increase of a vehicle speed by adding a vehicle-speed-variation correction value NINTLSPD calculated by multiplying a variation amount ΔV of the vehicle speed and a predetermined correction value α,
the acceleration demand determining value being determined depending on a road surface gradient being a running resistance of a vehicle such that the shift mode is more difficult to be switched to the acceleration shift mode when the road surface gradient is larger than when the road surface gradient is smaller, and
during the acceleration shift mode, the correction coefficient α being determined such that as the road surface gradient becomes larger, the value of the correction coefficient α becomes larger, such that the shift control is performed so as to cause the input-shaft rotation speed to be higher when the road surface gradient is larger than when the road surface gradient is smaller.

2. The shift control device for the vehicular continuously variable transmission according to claim 1, wherein a rise amount of the input-shaft rotation speed during a transition from the normal shift mode to the acceleration shift mode is larger when the road surface gradient is larger than when the road surface gradient is smaller.

3. The shift control device for the vehicular continuously variable transmission according to claim 1, wherein during the normal shift mode, a shift control is performed such that the input-shaft rotation speed is increased in proportion to the increase of the vehicle speed.

4. The shift control device for the vehicular continuously variable transmission according to claim 1, wherein the acceleration shift mode performs the shift control such that a target rotation speed NINT is calculated by adding an acceleration target-rotation-speed reference value NINTLB, an accelerator operation correction value NINTLPAP and a vehicle-speed-variation correction value NINTLSPD and that an actual input-shaft rotation speed NIN matches with the target rotation speed NINT.

* * * * *